United States Patent [19]

Henderson

[11] Patent Number: 4,664,901
[45] Date of Patent: May 12, 1987

[54] PROCESS FOR PRODUCING CARBON BLACK

[75] Inventor: E. Webb Henderson, Bartlesville, Okla.

[73] Assignee: Phillips Petroleum Company, Bartlesville, Okla.

[21] Appl. No.: 708,141

[22] Filed: Mar. 4, 1985

[51] Int. Cl.[4] .......................... C01B 31/02; C09C 1/48
[52] U.S. Cl. .................................. 423/450; 423/455; 423/456; 423/457; 422/150
[58] Field of Search ............... 423/449, 450, 455, 456, 423/457, 458; 422/150

[56] References Cited

U.S. PATENT DOCUMENTS

| 2,375,795 | 5/1945 | Krejci | 23/209.8 |
|---|---|---|---|
| 2,616,795 | 11/1952 | Krejci | 23/209.8 |
| 2,682,450 | 6/1954 | Sweigart et al. | 23/259.5 |
| 2,851,337 | 9/1958 | Heller | 23/209.8 |
| 2,852,346 | 8/1958 | Austin | 23/209.6 |
| 3,375,075 | 3/1968 | Ruble | 23/209.4 |
| 3,498,753 | 3/1970 | Hokari et al. | 23/277 |
| 3,867,100 | 2/1975 | Chang | 423/456 |
| 3,922,335 | 11/1975 | Jordan et al. | 423/450 |
| 4,051,135 | 9/1977 | Vanderveen | 23/259.5 |
| 4,179,494 | 12/1979 | Rothbühr et al. | 423/456 |
| 4,241,022 | 12/1980 | Kraus et al. | 422/156 |
| 4,267,160 | 5/1981 | Kraus et al. | 423/456 |
| 4,289,743 | 9/1981 | Ruble | 423/450 |
| 4,438,087 | 3/1984 | Casperson | 423/455 |

FOREIGN PATENT DOCUMENTS 0102072 3/1984 European Pat. Off. .

Primary Examiner—Gregory A. Heller
Attorney, Agent, or Firm—John R. Casperson

[57] ABSTRACT

An axial flow carbon black reactor can be provided with multiple expansion steps in the reactor expansion zone, tangential air entries into the steps, tangential process air entry with straightening vanes in the converging zone to provide axial reactor flow, tangential process air entry using longitudinal baffles in the reactor expanded zone to provide axial reactor flow; multiple expansion steps with flow of fluid from the converging zone and into the steps and multiple step expansions of the reactor expansion zone with downstream sloping faces on the steps.

6 Claims, 4 Drawing Figures

PROCESS FOR PRODUCING CARBON BLACK

BACKGROUND OF THE INVENTION

In one aspect, the invention relates to a carbon black reactor. In another aspect, the invention relates to a process for producing carbon black. In yet another aspect, the invention relates to at least partially converting a swirl flow carbon black reactor into a more axial flow reactor.

Turbulence in the carbon black reactor has a large influence on the properties of the carbon black particles produced. It must be recognized, however, that turbulence other than in the region of active carbon formation has little influence on the process and simply causes high pressure drop.

At least four factors assist in the creation of turbulence in the carbon forming zone. These factors are combustion gas turbulence, combustion generated turbulence, expansion turbulence, and wall friction turbulence.

Combustion gas turbulence can be affected by whether the combustion gases have a swirling motion when they enter the zone of carbon formation. Combustion generated turbulence is generally brought about by providing the combustion gases with some free oxygen to burn a portion of the oil feedstock and assist in vaporization of the oil droplets. Expansion turbulence can be brought about by passing the reaction mass through a constriction followed by one or more expansions in the reaction passage positioned so as to determine at least a portion of the zone of carbon formation. Well friction turbulence can be influenced by the shape of the materials defining the outer limits of the reaction flow passage.

Because turbulence divides the carbon into particles and promotes interaction between the particles it has a large effect on resultant carbon black properties, especially surface area and structure. Provision for providing and controlling the amount of turbulence in the carbon forming zone of a reactor would clearly be very desirable.

OBJECTS OF THE INVENTION

It is one object of this invention to provide certain features which can be incorporated into a carbon black reactor to promote turbulence in the carbon forming zone.

It is another object of this invention to provide a carbon black forming process and apparatus in which turbulence is brought about by the shapes of the reaction flow passage.

It is yet another object of this invention to provide a carbon black process and apparatus in which turbulence is caused by injection of oxygen containing gases at several locations in the carbon black reactor.

SUMMARY

In one embodiment of the invention a carbon black reactor is provided which comprises a generally cylindrical combustion zone, a converging zone, and a generally cylindrical reactor throat. The throat is connected to the combustion zone by the converging zone. A generally cylindrical pyrolysis zone is positioned downstream from the throat. The pyrolysis zone has a larger diameter than the throat. The apparatus is provided with the means for forming hot combustion gases in the combustion zone. Means is provided for introducing a carbonaceous feedstock into at least one of the converging zone and the reactor throat. A means is provided for introducing quench fluid into a downstream end of the pyrolysis zone. In this reactor, the improvement is provided which comprises positioning at least one expansion and choke zone between the reactor throat and the upstream end of the pyrolysis zone. The pyrolysis zone is still positioned within a distance of about 6 throat diameters from the reactor throat. However, the reaction mixture is subjected to multiple pressure drops during the carbon forming reaction. This embodiment of the invention provides a carbon black product with good structure.

In another embodiment of the invention, there is provided a carbon black reactor having a generally cylindrical combustion zone, a reactor throat, and a converging zone connecting the generally cylindrical combustion zone with the reactor throat. A generally cylindrical pyrolysis zone having a diameter in the range of from about 1.5 to about 5 times the diameter of the reactor throat is positioned downstream of the throat. The apparatus is provided with means for forming hot combustion gases in the generally cylindrically combustion zone and means for introducing a carbonaceous feedstock into at least one of the converging zone and the reactor throat for reaction with the combustion gases to form the carbon black product. At least one tunnel inlet opens into the generally cylindrical combustion zone through the wall thereof for introducing oxygen to result in the formation of hot combustion gases in the combustion zone. The improvement comprises at least one vane positioned so as to reduce the swirl of the reaction mixture resulting from fluid flow through the tangential inlet. The vane can be positioned in any one or any combination of: the converging zone extending generally radially inwardly from the wall thereof; and/or the pyrolysis zone extending generally radially inwardly from the wall thereof. Positioning vanes upstream from the reactor throat in conjunction with utilizing swirling flow of combustion gases can be used to reduce the degree of swirl and reactor pressure drop. Positioning the vanes downstream of the throat has direct effect on the type of turbulence in the reactor carbon forming zone.

In a still further embodiment of the present invention, there is provided a carbon black reactor which has a generally cylindrical combustion zone, a converging zone and a reactor throat. The converging zone connects the combustion zone with the reactor throat. A generally cylindrical pyrolysis zone downstream of the reactor throat is provided which has a diameter in the range of from about 1.5 to about 5 times the diameter of the reactor throat. A generally annular wall is positioned between the reactor throat and the pyrolysis zone facing in the downstream direction. The reactor is provided with a means for providing hot combustion gases which flow from the generally cylindrical combustion zone to the generally cylindrical pyrolysis zone. The reactor further has a means for introducing a carbonaceous feedstock into at least one of the converging zone and the reactor throat. The reactor is further provided with a means for introducing a quench fluid at the downstream end of the generally cylindrical pyrolysis zone. The improvement comprises a means for introducing free oxygen containing gas next to the at least one downstream facing generally annular wall positioned between the reactor throat and the pyrolysis zone. The free oxygen can react with the carbonaceous feedstock in the carbon forming zone to cause desirable combustion turbulence influencing the properties of the resultant carbon black product.

In a still further aspect of the invention, there is provided a process for producing carbon black characterized at least in part by the flowing of the reaction mixture through at least one expansion and choke zone positioned between the reactor throat and the upstream end of the pyrolysis zone. The expansion and choke zone is positioned within a distance of about 6 reactor throat diameters from the point of introduction of the carbonaceous feedstock.

In a still further aspect of the invention, there is provided a process for producing carbon black characterized at least in part by the deflection of the flow of hot combustion gases to reduce the degree of swirl by at least one vane positioned in at least one of a tangential inlet to the combustion zone for the introduction of oxygen-containing gas thereinto, the converging zone along the wall thereof, or the pyrolysis zone along the wall thereof.

In a still further aspect of the invention, there is provided a process for the production of carbon black characterized at least in part by the introduction of a free oxygen-containing gas into an abruptly expanding reaction mixture.

DETAILED DESCRIPTION OF THE INVENTION

Figure 1:
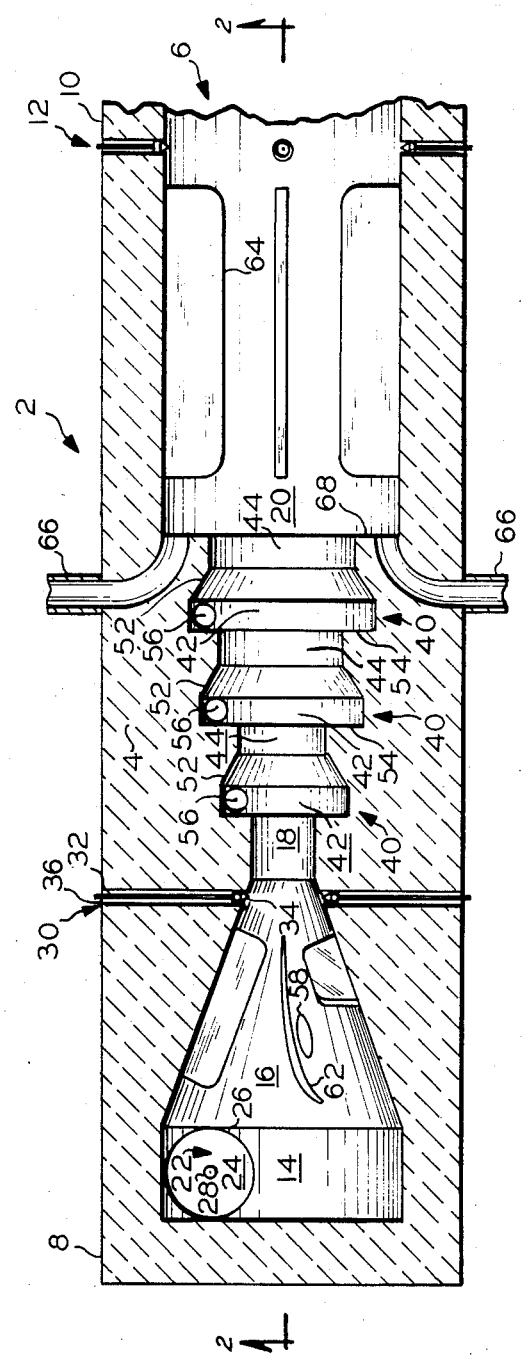
FIG. 1 is a side sectional view of the carbon black reactor embodying certain features of an embodiment of the invention.
Figure 2:
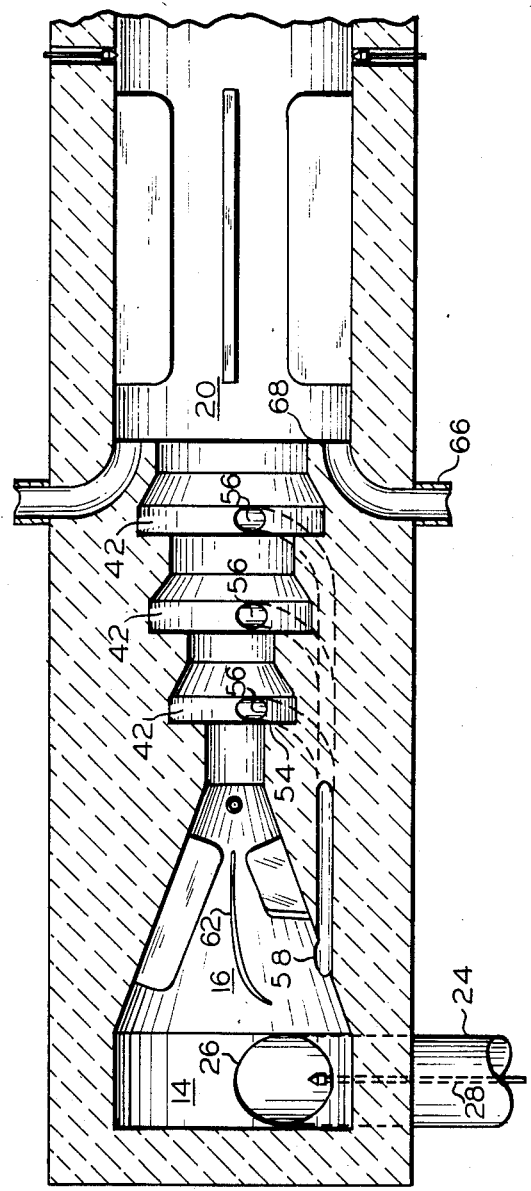
FIG. 2 is a view of the reactor as would appear when viewed in side section along lines 2—2 of FIG. 1.

In one embodiment of the invention, carbon black reactor 2 is defined by a refractory material 4 which defines a reaction flow passage 6. The reactor 2 has an upsteam end 8 and a downstream end 10 which for purposes of discussion herein is determined by means 12 for the introduction of a quench fluid, usually water. It will be appreciated however that conventional cooling and collection equipment can be associated with the reactor further downstream from the means 12. The refractory 4 defines, from upstream end 8 to downstream end 12 a generally cylindrical combustion zone 14, a converging zone 16, and a generally cylindrical reactor throat 18. The converging zone 16 connects the generally cylindrical combustion zone 14 with the reactor throat 18. The reactor throat has a diameter sized to determine the velocity of fluids passing through it. For commercially sized apparatus the throat 18 will generally range from about 4 to about 30 inches in diameter depending in large part on the particle size of carbon black desired. For "hard" carbon blacks having a CTAB surface area ranging upwards from about 70 square meters per gram, the throat 18 will usually have a diameter in the range of from about 4 to about 16 inches in diameter for commercial size apparatus, usually from about 4 to about 8 inches in diameter. A generally cylindrical pyrolysis zone 20 is positioned downstream from the reactor throat and has a second diameter which is larger than the first diameter. Generally the diameter of the zone 20 will be from about 1.1 to about 10 times the diameter of the reactor throat 18, usually from about 1.5 to about 5 times the diameter of the reactor throat 18.

A means 22 is provided for forming hot combustion gases in the combustion zone 14. Usually the means 22 is formed by a tunnel 24 which opens generally in a tangential direction into the combustion zone 14 via an inlet 26. The tunnel 24 is connected to a source of oxygen containing gas, usually air, preferably air which has been preheated to a temperature in the range of from about 600 to about 1600° F. A fuel tube 28 supplies combustible fluid to the tunnel 24. Generally, the combustible fluid will comprise natural gas or substitute natural gas, although the invention may also be practiced using oil or low B.T.U. fuel such as filter off-gas. The amount of oxygen emitted into the combustion zone 14 from the tunnel 24 will generally be in excess of the amount of oxygen required for stoichiometric combustion of the combustible fluid emitted from the tube 28. Generally, from about 10% to about 200% in excess of the stoichiometric requirement of oxygen will be emitted from the tunnel 24 into the zone 14 for hard black production, usually from about 30% to about 70% in excess of the stoichiometric requirement. However, for the production of soft carbon blacks, even greater excesses of the stoichiometrical oxygen requirement can be introduced via the tunnel 24.

Reactor 2 is further provided with a means 30 for introducing a carbonaceous feedstock into at least one of the converging zone 16 and the reactor throat 18. Preferably, the means 30 comprises at least one oil tube 32 terminated at its downstream end by a nozzle 34. The oil tube 32 is preferably disposed radially with respect to the longitudinal axis of the reactor 2 and is oriented so as to introduce a spray of feedstock generally radially inwardly into the hot combustion gases. It is desirable to provide a flow of steam along the annulus 36 between the tube 32 and the reactor refractory 4 to prevent overheating of the nozzle 34 and to provide for positive pressure so that the reactor tube 32 and nozzle 34 can be changed during operation of the reactor 2. The reactor tube 32 is connected to the source of carbonaceous feed stock at elevated pressure. The most preferable feed stock contains a high concentration of aromatic oil. The feedstock is preferably preheated prior to being introduced into the reactor tube such as to a temperature in the range from about 200 to about 500° F. The nozzle 34 through which the carbonaceous feed stock is emitted into the reactor preferably emits a spray of feed stock droplets optionally in admixture with an atomizing fluid. It is expected that good results can be obtained where a feedstock nozzle is selected which permits a feedstock spray which diverges in a cone shaped pattern at an angle in the range of from about 30 to about 120°. The feedstock pressure should be adequate for proper atomization, which of course depends on the feedstock, temperature and the characteristics of the nozzle 34. However, the feedstock pressure should not be so high as to cause penetration of the feedstock to impinge on the opposite reactor wall. Generally, a feedstock pressure in the range of from about 100 to about 300 psig will be used, with small benefits being obtainable by using even higher pressures. Although any number of feedstock tubes 32 can open into the reactor, obtaining a good distribution of feedstock with a small number of nozzles such as 1 or 2, is difficult. Obtaining adequate feedstock penetration when a large number of small orifice nozzles is used, such as in the range of from about 7 to 20 is also difficult. Thus, preferably in the range of from about 3 to about 6 of the carbonaceous feedstock tubes 32 are employed, preferably equiangularly spaced about the reactor axis. It should be pointed out that higher tint blacks can be produced where the feedstock is introduced into the converging zone of the reactor while lower tint black would be introduced where the feedstock is introduced into the reactor throat, or where the feedstock is introduced into both the converging zone and the reactor throat.

The means 12 for introducing prequench fluid determines the downstream end of the reactor for purposes of the present discussion since it is at this point that the reaction mixture is cooled to below carbon forming temperatures. Usually, water is used as the quench fluid to cool the reaction mixture to below 1800° F. Other fluids can be used if desired. The quench means 12 is generally located between about 2 and 10 feet downstream from the injection of carbonaceous feedstock in hard black reactors. In soft black reactors, the quench means is generally located from about 8 to 20 feet downstream from carbonaceous feedstock injection.

In accordance with one embodiment of the invention, an expansion and choke zone 40 is positioned between the reactor throat and the upstream end of the pyrolysis zone 20 which follows within a distance of about 6 throat diameters from the reactor throat 18. Usually, a plurality of expansion and choke zones will be positioned between the throat and in the upstream end of the pyrolysis zone 20. However, it is essential to this embodiment of the invention that at least one expansion zone 42 and at least one choke zone 44 be positioned between the reactor throat 18 and the pyrolysis zone 20.

In a preferred embodiment of the invention, from 2 to about 6 expansion zones and choke zone 42 and 44 are positioned between the reactor throat 18 and the pyrolysis zone 20. For example, in the FIGURES, three expansion zones and three choke zones are positioned between the reactor throat 18 and the pyrolysis zone 20. In one embodiment of the invention, illustrated best by FIG. 3, expansion and choke zones in a reactor 102 are determined by an annular flow passage between an axial structure 146 comprising a central shaft 148 and circular baffles 150 mounted thereon. The circular baffles 150 and shaft 148 provide alternating expansion and choke zones in the upstream end of the pyrolysis zone 20 for the annular flow of the reaction mixture. Preferably, the circular baffles 150 decrease in diameter from the upstream to the downstream direction. The baffles are mounted coaxially to the shaft 148 and are preferably spaced apart along the shaft on a center to center spacing in the range of from about 0.3 to about 3 throat diameters. Where circular baffles 150 are used, they can decrease in size in the downstream direction in the pyrolysis zone so that the annularly shaped chokes determined by the annulus between each baffle 150 and the reactor wall increases in cross sectional area to provide for a slowing in the fluid flow.

In a preferred embodiment of the invention, each expansion 42 in an expansion and choke zone 40 is generally cylindrical and each choke 44 in an expansion and choke zone 40 is also generally cylindrical. More preferably, each of the expansions and chokes are characterized by larger diameters in the downstream direction. In the one embodiment of the invention, frustoconical converging zones 52 connect each expansion zone 42 with the next adjacent downstream choke zone 44. Annular walls 54 connect each choke 42 with the next adjacent downstream expansion zone 42.

If desired, all or a portion of the expansion zones 42 can be provided with a means 56 for introducing hot gases containing free oxygen. Preferably, the means 56 is formed by a tunnel which opens into each of the expansion zones 42 in a generally tangential direction. In one embodiment, each of the tunnels 56 is connected to an inlet 58 in the frustoconical converging zone 16. In another embodiment, shown best by FIG. 3, tunnels 156 which open generally tangentially into expansion zones 142 are connected to a hot air header 158 to provide oxygen containing gas to the carbon forming zone.

It is preferred that the reaction mass undergo an expansion in cross sectional area during carbon formation at an average expansion angle in the range of from about 4° to about 15° after passage through the reactor throat. Therefore, it is preferred that the chokes 44 be sized and positioned so that a cone drawn from the longitudinal axis of the reactor throat to the surfaces determining the choke forms an expansion angle averaging in the range of from about 4° to about 15° with the longitudinal axis of the reactor throat. More preferably, the expansion angle is in the range of from about 5° to about 10°.

Operation of a carbon black reactor as described above could be as follows. A hot stream of combustion gases is sequentially flowed through a converging zone 16, a reactor throat 18 and into a pyrolysis zone 20 of a carbon black reactor. A carbonaceous feedstock is injected into these hot combustion gases in at least one of the converging zone 16 and the throat 18 through feedstock tubes 32 to form a reaction mixture. The reaction mixture is quenched at the downstream end of the pyrolysis zone 20 by the quench means 12. To influence the structure of the carbon black product, the reaction mixture flows through at least one expansion and choke zone 40 positioned downstream of the reactor throat within a distance of about 10 reactor throat diameters from the point of introduction of the carbonaceous feedstock. To provide for desirable expansion in the reaction mixture, it is preferably flowed through a plurality of expansion and choke zones positioned between the reactor throat and the upstream end of the pyrolysis zone and the choke zones increase in diameter from the upstream to the downstream direction. A smoother transition can be caused by providing a plurality of expansion and choke zones, preferably in the range of from about 2 to 6 between the reactor throat and the upstream end of the pyrolysis zone 20. To further smooth the transition and reduce unnecessary pressure drop, the reaction mixture can be flowed through a converging zone defined at 52 immediately prior to flowing the reaction mixture through each choke zone 44. Preferably, the pyrolysis zone has a diameter in the range of from about 1.5 to about 5 times the diameter of the reactor throat and the reaction mixture expands at an average angle in the range of from about 4 to about 15° over the expansion and choke zones as measured with respect to a longitudinal axis of the pyrolysis zone. Preferably, the average expansion angle is in the range from 5° to about 10°.

Figure 4:
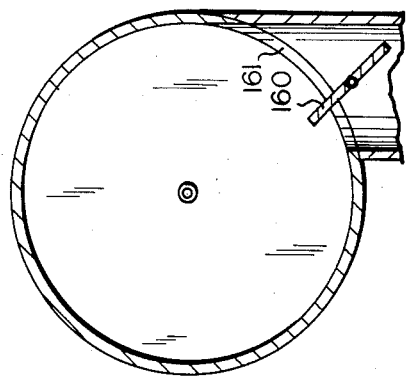
FIG. 4 is a cross-sectional view of the reactor of FIG. 3 as would appear when viewed from the persepctive of lines 4—4 of FIG. 3.

In another embodiment of the invention, there is provided a carbon black reactor 2 having a refractory lined tunnel 4 defining the generally cylindrical combustion zone 14, a reactor throat 18, and a converging zone 16 connecting the combustion zone 14 with the reactor throat 18. The generally cylindrical pyrolysis zone 20 is positioned downstream of the reactor throat and has a diameter in the range of from about 1.5 to about 5 times the reactor throat. A means 22 for forming hot combustion gases is provided in the generally cylindrical combustion zone 14. A means 30 is provided for introducing a carbonaceous feedstock into at least one of the converging zone 16 and reactor throat 18. The means for forming hot combustion gases in the generally cylindrical combustion zone 14 comprises at least one tunnel inlet 26 emptying into the carbon black reactor 2 in a generally tangential direction with respect to the wall of the generally cylindrical combustion zone 14. In accordance with certain aspects of the present invention, at least one vane for influencing flow is positioned in at least one of the following positions. As best shown by FIG. 4 a vane 160 is positioned to extend at least partially across a tangential inlet 161. In the apparatus of FIG. 1, at least one vane 62 may extend generally radially inwardly from the wall of the converging zone 16. Also, in FIG. 1, it is shown that at least one vane 64 may extend generally radially inwardly from the wall of the pyrolysis zone 20. Vanes may be positioned at one or more of the above described position to reduce the swirl in the reaction mixture. In a preferred embodiment, where a vane 160 is positioned across the tangential air inlet 161, it is also adjustable about an axis which is parallel to the longitudinal axis of the reactor. In this manner, the degree of tangential motion caused by fluid flow through the inlet 161 can be adjusted as desired. In another preferred embodiment, a plurality of vanes 62 are positioned in the converging zone 16. The vanes 62 are preferably elongated with respect to the longitudinal axis of the reactor 2 and are aerodynamically curved at their upstream ends depending on the direction of introduction of fluid through the inlet 26 in a counter rotational direction with respect to fluid flow when looking upstream. Generally, the vanes 62 will be curved with a decreasing rate of spiral toward the downstream end to mitigate pressure drop while reducing vortex motion in the swirling hot combustion gases. Where a separate tunnel 56 provides for flow of combustion gases from the converging zone 16 to an expansion zone 42, the inlet 58 to the tunnel is preferably positioned on the upstream, high pressure side of a vane 62. FIG. 1 also illustrates an embodiment of the invention wherein at least one vane 64 is positioned in the pyrolysis zone 20. Preferably, a plurality of vanes 64 are positioned in the pyrolysis zone 20 and each of them is longitudinally elongated and extends generally radially inwardly from the wall of the pyrolysis zone 20 in the range of from about 0.1 to about 0.4 times the diameter of the pyrolysis zone 20. So as to influence the progress of the carbon forming reaction, it is preferred that the vanes 64 be positioned within about 10 reactor throat diameter from the position of injection of the carbonaceous feedstock via the tubes 32 and extend generally longitudinally along the reactor wall at least to near the position of quench injection at means 12. In a further embodiment of the invention where vanes 64 have been placed in the pyrolysis zone a means 66 is provided for introducing free oxygen containing gas near the upstream ends of each of the vanes 64 in the pyrolysis zone 20. In the illustrated embodiment, the means 66 is formed by tunnels which empty into the pyrolysis zone 20 through annular wall 68 toward the upstream end of a vane 64. Free oxygen introduced into the pyrolysis zone 20 from the tunnel 66 helps prevent carbon deposits from accumulating on the vanes 64 and provides for stable reactor operation.

Figure 3:
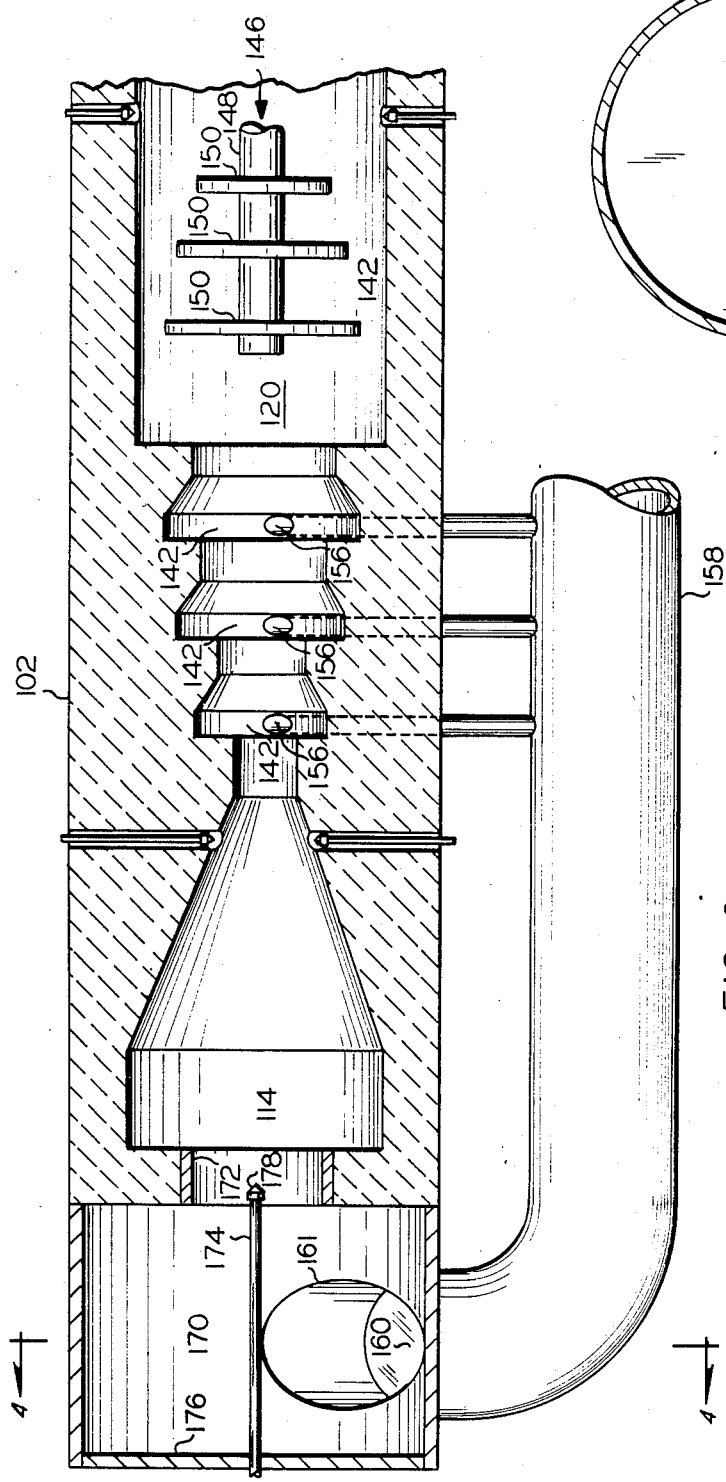
FIG. 3 is a side sectional view of a carbon black reactor embodying certain features of an embodiment of the invention.

In an embodiment of the invention as shown in FIGS. 3 and 4, where the vane 160 is positioned upstream of the carbon-forming reaction, it may be formed from an inexpensive metal such as steel. Vanes 62 or 64 should be constructed from a ceramic or other material highly resistant to high temperature on the order of 3400° F. The vanes can be anchored in place by casting the refractory material 4 around the vanes while they are retained in a suitable support followed by curing. The reactor is usually cast in sections to facilitate fabrication.

The just described device can be used in a process comprising establishing a swirling flow of hot combustion gases in a combustion zone 14 of a carbon black reactor 2 and flowing the hot gases from the combustion zone 14 through a converging zone 16, a reactor throat 18 and into a pyrolysis zone 20. A carbonaceous feedstock is introduced into the hot combustion gases in at least one of the converging zone 16 and the reactor throat 18 to form a reaction mixture. The reaction mixture is quenched at the downstream end of the pyrolysis zone by the introduction of a suitable quench fluid. To reduce the degree of swirl of the combustion gases, the flow is deflected by a vane or vanes positioned in at least one of a tangential inlet to the reactor for the introduction of the oxygen-containing gas; a vane or vanes positioned in the converging zone along the wall thereof; and a vane or vanes positioned along the wall of the pyrolysis zone. In the embodiment of the invention illustrated best by FIG. 3, the tangential inlet 161 to the reactor in which the vane 160 is positioned opens generally tangentially into a mixing zone 170 which in turn empties into a combustion zone 114. The mixing zone 170 is generally cylindrical in shape and is positioned coaxially with respect to the longitudinal axis of the combustion zone 114 with which it is connected by a choke 172. Combustible fluid is admixed with the oxygen containing gases introduced into the zone 170 via tangential air inlet 161 through a combustible fluid tube 174 positioned on the reactor axis from an upstream end 176 of the mixing zone and emptying into the reaction flow passage via a nozzle 178. The nozzle 178 is preferably positioned upstream of the combustion zone 114. Residual swirl of the oxygen containing gases flowing through the choke 172 provides for establishing a swirling flow of hot combustion gases in the combustion zone 114. The vane 160 is positioned across the tangential inlet 161 to the mixing zone 170 to reduce the degree of swirl in the mixing zone.

The hot gases may be deflected by vanes positioned in the converging zone 16 and or the pyrolysis zone 20 of the reactor. Where vanes 62 are positioned in a converging zone 16 the vanes will generally have an upstream end and a downstream end and be constructed to follow a generally spiral path near their upstream end and a generally longitudinal path near their downstream end to reduce swirl of combustion gas. Where vanes 64 are positioned in the pyrolysis zone 20 the hot gases may be deflected to follow a more longitudinal flow path where the vanes extend in a generally longitudinal direction.

In yet another embodiment of the invention there is provided a carbon black reactor having a generally cylindrical combustion zone 14, a converging zone 16, a reactor throat 18, the reactor throat 18 being connected to the combustion zone 14 by the converging zone 16. A generally cylindrical pyrolysis zone 20 is positioned downstream of the reactor throat 18 and has a diameter in the range of from about 1.5 to about 5 times of the reactor throat 18. The reactor has at least one generally annular wall 68 or 54 positioned between the reactor throat 18 and the pyrolysis zone 20. The annular wall faces in downstream direction. The reactor is provided with a means 22 for forming hot combustion gases which flow from the generally cylindrical combustion zone 14 to the generally cylindrical pyrolysis zone 20. A means 30 for introducing a carbonaceous feedstock into at least one of the converging zone 16 and the reactor throat 18 is also provided, as is a means 12 for introducing a quench fluid at the downstream end of the generally cylindrical pyrolysis zone 20. In this embodiment of the invention there is provided a means for introducing free oxygen containing gas next to the at least one downstream facing generally annular wall 54 and/or 68 positioned between the reactor throat 18 and the pyrolysis zone 20. The means can be formed by the tunnel 56 as previously described which opens generally tangentially into an upstream portion of the pyrolysis zone closely downstream from an annular wall. Each tunnel 56 can be connected to a source of free oxygen containing gas directly as illustrated in FIG. 3 for example, or, if desired, each tunnel 56 can be connected to the converging zone 16 of the reactor. In accordance with this embodiment of the invention, hot combustion gases are formed in the generally cylindrical combustion zone 14. The hot combustion gases are flowed from the combustion zone 14, through the converging zone 16, the reactor throat 18, and into the pyrolysis zone 20. The carbonaceous feedstock is introduced into the hot combustion gases in at least one of the converging zone 16 of the reactor throat to initiate a carbon forming reaction. This carbon forming reaction is terminated by the introduction of a quench fluid via the means 12 at the downstream end of the pyrolysis zone. Where the reaction mixture expands rapidly between the reactor throat 18 and the pyrolysis zone 20 due to the flow of the reaction mixture through at least one abrupt divergence in the reactor flow passage between the reactor throat and the pyrolysis zone. There is provided the improvement of introducing a free oxygen containing gas into the abruptly expanding reaction mixture. The source of the free oxygen containing gas can be from a portion of the hot combustion gases removed from the converging zone and introduced into the abruptly expanding reaction mixture through a tunnel. If desired, hot air can be introduced into the abruptly expanding mixture. It is contemplated that in the range of from about 5 to 25 percent by volume of the reactor flow immediately prior to quench can be constituted by the free oxygen containing gas or the reaction products therefrom which was added directly to the abruptly expanding reaction mixture.

The invention is illustrated by the following example.

EXAMPLE I

Six runs to provide a high structure carbon black in accordance with this invention are illustrated in Table I, and eight runs in a control reactor are illustrated in Table 11. The results of the inventive runs and the control runs are compared in Table III.

The runs in Table I illustrating the invention were carried out in an experimental reactor having an expansion and choke zone positioned between a 1.7 inch reactor throat and the pyrolysis zone. The expansion and choke zone had four expansion sections and four choke sections, increasing in diameter from the reactor throat to the pyrolysis zone as shown in FIG. 1. The expansion sections were 3¾", 4", 4½" and 5" in diameter and the corresponding choke sections were 2", 2¼", 3" and 3¼" in diameter. The pyrolysis zone was 6" in diameter. Other important reactor dimensions are given in Table I.

The feed oil used in all the runs had the following properties: API gravity, 60/60° F., −2.0; BMCI, 138; components in wt. %, carbon 91.3, hydrogen 7.0, nitrogen 0.2 and sulfur 1.5.

TABLE I

|  | Run 1 | Run 2 | Run 3 | Run 4 | Run 5 | Run 6 |
|---|---|---|---|---|---|---|
| Oil Rate, LBS/HR. | 252.9 | 226.7 | 205.4 | 187.9 | 226.7 | 205.4 |
| Oil Entry, Inches[a] | 6.5 | 6.5 | 6.5 | 6.5 | 3.5 | 3.5 |
| Air Rate, SCF/Hr | 14,000 | 14,000 | 14,000 | 14,000 | 14,000 | 14,000 |
| Fuel (1000 Btu/SCF), SCF/Hr | 880 | 880 | 882 | 882 | 882 | 882 |
| Air/Oil, SCF/Gal. | 510 | 569 | 628 | 687 | 559 | 615 |
| Reactor length, inches[b] | 72 | 42 | 26 | 22 | 47 | 31 |
| Yield, LBS/Gal. | 5.46 | 5.14 | 4.79 | 4.46 | 5.22 | 4.96 |
| Carbon Black Properties |  |  |  |  |  |  |
| Photelometer[c] | 80 | 81 | 75 | 76 | 82 | 83 |
| I$_2$ Number[d] | 93 | 112 | 130 | 152 | 104 | 124 |
| N$_2$SA[e] | 90 | 109 | 133 | 162 | 101 | 124 |
| CTAB[f] | 89 | 107 | 122 | 137 | 95 | 115 |
| 24m4 DBP[g] | 109 | 120 | 122 | 128 | 106 | 107 |
| Tint[h] | 98.8 | 109.9 | 118.2 | 123.3 | 105.3 | 114.0 |

TABLE I-continued

|  | Run 1 | Run 2 | Run 3 | Run 4 | Run 5 | Run 6 |
|---|---|---|---|---|---|---|
| Tint Residual[i] | −0.9 | +3.7 | +8.3 | +12.2 | +2.1 | +2.7 |

[a] Measured upstream from the throat outlet end of the converging zone.
[b] From outlet end of throat of converging zone to water quench injection.
[c] ASTM D 1618-81
[d] ASTM D 1510-81
[e] ASTM D 3037-81
[f] ASTM D 3765-81
[g] ASTM D 3493-81
[h] ASTM D 3265-81
[i] TR = Tint − (56.0 + 1.057(CTAB) − 0.002745(CTAB)$^2$ − 0.2596(DBP) − 0.201($N_2$SA—CTAB))
Reactor Pressure @
Air inlet, about 7.0 psig.
Air Preheated to 1200° F.
Oil Preheated to 160° F.
Oil Injection points 3 each @ 90°-90°-180° spacing
Oil nozzles 0.039" open holes The reaction zone for the runs in Table II was a 6" diameter cylindrical section connected to a 1.7 inch reactor throat by an annular wall.

TABLE II

|  | Run 7 | Run 8 | Run 9 | Run 10 | Run 11 | Run 12 | Run 13 | Run 14 |
|---|---|---|---|---|---|---|---|---|
| Oil Rate Lbs/Hr. | 234.8 | 234.8 | 220.2 | 198.7 | 232.5 | 219.5 | 236.2 | 219.5 |
| Oil entry, inches[a] | 5½ | 5½ | 5½ | 5½ | 8½ | 8½ | 8½ | 8½ |
| Air Rate, SCF/Hr. | 14,000 | 14,000 | 14,000 | 14,000 | 14,000 | 14,000 | 14,000 | 14,000 |
| Fuel (1000 Btu/SCF), SCR/Hr. | 864 | 875 | 880 | 880 | 875 | 880 | 880 | 880 |
| Air/Oil, SCF/Gal. | 538 | 532 | 568 | 626 | 536 | 568 | 526 | 566 |
| Reactor length, inches[b] | 72 | 72 | 72 | 55 | 72 | 60 | 72 | 57 |
| Yield, Lbs/Gal. | 5.01 | 5.10 | 4.87 | 4.56 | 5.09 | 4.9 | 5.14 | 4.92 |
| Carbon Black Properties |  |  |  |  |  |  |  |  |
| Photelometer[c] | 69 | 70 | 83 | 84 | 75 | 80 | 82 | 81 |
| $I_2$ Number[d] | 106 | 109 | 122 | 142 | 115 | 121 | 116 | 129 |
| $N_2$SA[e] | 105 | 107 | 119 | 149 | 115 | 122 | 112 | 130 |
| CTAB[e] | 105 | 104 | 115 | 136 | 111 | 116 | 109 | 119 |
| 24M4 DBP[g] | 102 | 99 | 101 | 103 | 110 | 111 | 108 | 110 |
| Tint[h] | 116.4 | 117.0 | 123.1 | 127.8 | 110.6 | 113.6 | 114.3 | 118.3 |
| Tint residual[i] | 6.1 | 6.9 | 8.8 | 8.4 | 0.22 | 1.8 | 4.7 | 6.1 |

[a] Measured upstream from the throat outlet end of the converging zone.
[b] From outlet end of throat of converging zone to water quench injection.
[c] ASTM D 1618-81
[d] ASTM D 1510-81
[e] ASTM D 3037-81
[f] ASTM D 3765-81
[g] ASTM D 3493-81
[h] ASTM D 3265-81
[i] TR = Tint − (56.0 + 1.057(CTAB) − 0.002745(CTAB)$^2$ − 0.2596(DBP) − 0.201($N_2$SA—CTAB))

Table III combines the results of Tables I and II.

TABLE III

| REACTOR | RUNS | ENTRY (a) | AVERAGE YIELD | A/O | AVERAGE 24M4DBP (g) |
|---|---|---|---|---|---|
| Inventive (Table I) | 5-6 | 3½ | 4.97 | 587 | 107 |
|  | 1-4 | 6½ | 5.0 | 598 | 120 |
| Control (Table II) | 7-10 | 5½ | 4.9 | 566 | 101 |
|  | 11-14 | 8½ | 5.05 | 549 | 110 |

The data in Table III above shows that carbon black structure was reduced by moving the oil entry location downstream for both the inventive and control reactors and more importantly, Table III shows a very significant increase in carbon black structure for the inventive reactor as compared to the control reactor without loss of yield.

That which is claimed is:

1. In a process for producing carbon black, said process comprising:
    (a) flowing a hot stream of combustion gases through a converging zone, a throat, and a pyrolysis zone of a carbon black reactor;
    (b) injecting a carbonaceous feedstock into the hot combustion gases in at least one of the converging zone and the throat of the carbon black reactor to form a reaction mixture; and
    (c) quenching the reaction mixture at the downstream end of the pyrolysis zone;

the improvement comprising:
    flowing the reaction mixture through from 2 to 6 expansion and choke zones positioned between the reactor throat and the upstream end of the pyrolysis zone within a distance of about ten reactor throat diameters from the point of introduction of the carbonaceous feedstock and wherein the choke zones serially increase in diameter toward the pyrolysis zone.

2. A process as in claim 1 further comprising flowing the reaction mixture through a converging zone immediately prior to flowing said reaction mixture through each choke zone.

3. A process as in claim 2 wherein the reaction mixture expands generally radially outwardly at an average expansion angle in the range of 4 to about 15 degrees over the expansion and choke zones as measured with respect to a longitudinal axis of the reactor.

4. A process as in claim 3 wherein the average expansion angle is in the range from 5 to 10 degrees.

5. A process as in claim 3 further comprising introducing hot gases into the reaction mixture in each of the expansions.

6. A process as in claim 3 wherein the pyrolysis zone has a diameter in the range from about 1.5 to about 5 times the diameter of the reactor throat.

* * * * *